Nov. 6, 1956

G. W. ALLEN 2,769,931

MAGNETIC AMPLIFIER CONTROL DEVICE
FOR AN ELECTROMAGNETIC CLUTCH

Filed March 16, 1955

INVENTOR
George W. Allen

WITNESS
William Martins

BY
ATTORNEY

United States Patent Office 2,769,931
Patented Nov. 6, 1956

2,769,931

MAGNETIC AMPLIFIER CONTROL DEVICE FOR AN ELECTROMAGNETIC CLUTCH

George W. Allen, Flanders, N. J., assignor to The Singer Manufacturing Company, Elizabeth, N. J., a corporation of New Jersey Application March 16, 1955, Serial No. 494,668

8 Claims. (Cl. 310—95)

This invention relates to motor control devices and more particularly to devices in which a magnetic amplifier is used to control the excitation of a slip clutch to maintain constant at a predetermined value the output speed of an electric motor system under variable load conditions.

It is an object of this invention to provide saturable reactors with suitable control windings and load windings in a bridge rectifier circuit for supplying a controlled direct-current for the exciting coil of a slip clutch.

It is a further object of this invention to provide a simple speed-measuring circuit especially adapted for supplying speed-responsive current to the low impedance control windings of a magnetic amplifier and without requiring the use of dynamoelectric generator devices.

The objects of this invention are attained by balancing the fluxes supplied in the control leg of a saturable reactor by separate coils, each excited responsive to a different control function. Essentially an adjustable reference flux is balanced against a speed flux to maintain a constant output speed.

In obtaining the speed flux, a saturating peaking transformer primary is supplied with saturating pulses of direct-current from a rotary switch or circuit-making and -breaking device driven by the output of the clutch. These pulses saturate the transformer to the same maximum flux for each pulse and the secondary voltage is a series of peaked pulses of repetition rate determined by the speed of the rotary switch. Due to the transformer saturation, these pulses have the same integrated volt-second area regardless of speed so that, when rectified and fed into the control winding, the average voltage and thus the coil current is an accurate measure of the number of pulses per unit time and hence of the rotary switch speed, which is the result desired.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
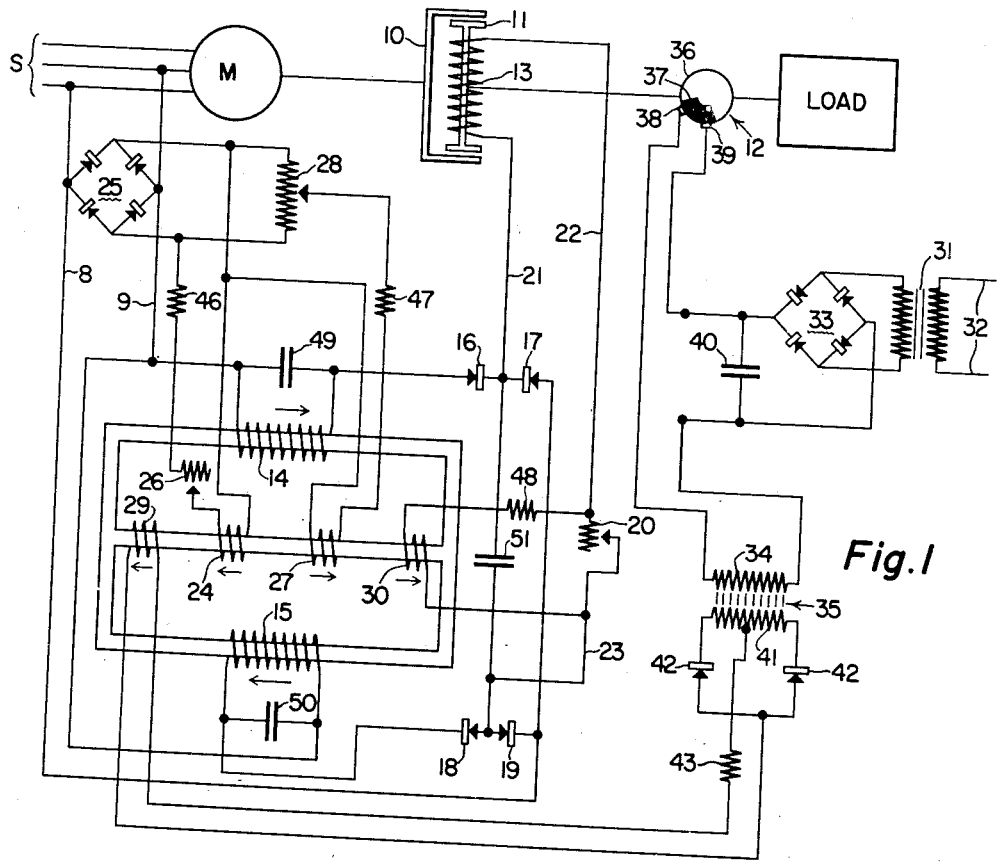
Figure 2:
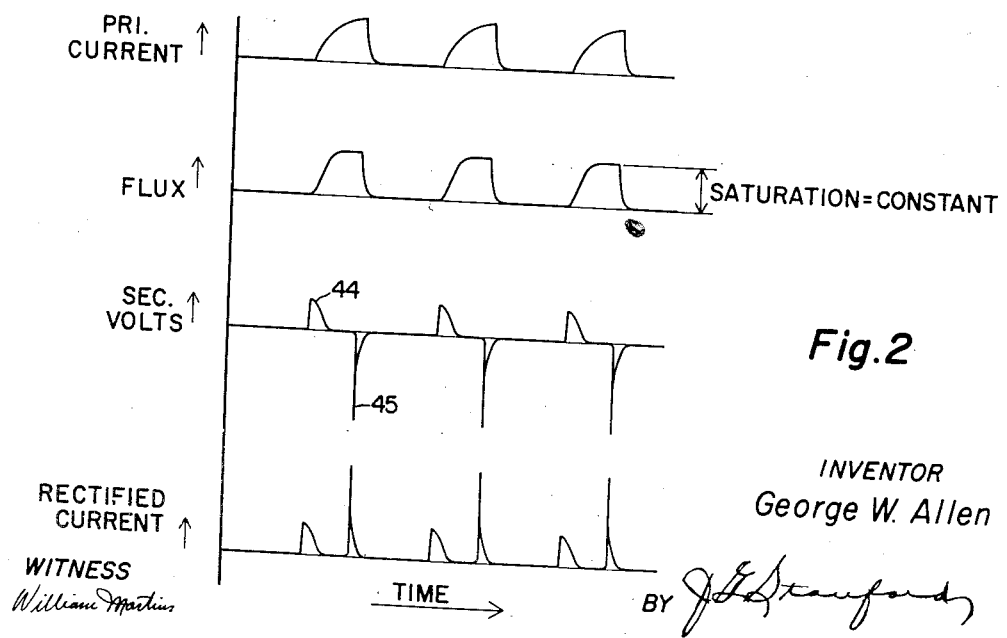

In the drawings, Fig. 1 is a diagram showing how this invention is applied to an electric motor control system. Fig. 2 shows the wave-forms of certain electrical quantities in the circuit of Fig. 1.

Referring now to Fig. 1, an electric motor M supplied from a source of A. C. electrical energy S is connected to drive an input member 10 of a slip clutch. The output member 11 of the clutch is connected to drive a load having a variable energy demand. A rotary switch 12 having a conducting segment is also arranged to be driven by the output member. A field coil 13 carried by the output member 11 of the clutch is excited by controlled direct current to furnish flux for the clutch to regulate the slip and thus the output speed of the clutch.

Current for the clutch field coil 13 is supplied by a magnetic amplifier of the self-saturating bridge type and may comprise a three-legged core having load windings 14, 15 and control windings 24, 27, 29 and 30 arranged on the core as shown in Fig. 1.

It will be seen that the load windings 14, 15 are each inserted in the adjacent legs of a bridge circuit formed by dry-disc rectifiers 16, 17, 18 and 19. This bridge is supplied by one phase of the A. C. supply S through leads 8 and 9. The clutch coil 13 connected in series with an adjustable resistance, 20 serves as a load for the bridge, being connected thereto by means of leads 21, 22 and 23. Each of the windings 14, 15 carries unidirectional pulses of current corresponding to alternate half-waves of the A. C. supply voltage and thus produces a self-saturating effect in the core after the manner shown and described in the U. S. Patent No. 2,012,588, F. G. Logan.

A bias control winding 24 is supplied with D. C. from a bridge rectifier 25 and has a series rheostat 26 to set the flux operating point. A reference control winding 27 is fed from a speed-setting potentiometer 28 connected across the bias-supplying bridge rectifier 25.

A speed control winding 29 is fed from a special D. C. supply, the voltage of which is maintained directly proportional to the output speed of the clutch by a tachometer circuit to be described subsequently. A compensating or positive feed-back control winding 30 is fed from the D. C. voltage drop across the adjustable resistance 20 in series with the clutch coil 13 and this improves the power gain of the amplifier.

The tachometer circuit comprises a transformer 31 fed from a single phase supply 32 which may be one phase of the regular supply S. A bridge rectifier 33 fed from the transformer 31 supplies pulses of D. C. to the primary winding 34 of a conventional saturating peaking transformer 35 the frequency or repetition rate of these pulses being controlled by the speed of a rotary switch or interrupter 12 driven by the output shaft of the clutch. This switch may comprise a rotatable insulated disc 36 with a conducting segment 37 and two stationary brushes 38, 39. A filter capacitor 40 is connected across the output of the bridge rectifier 33 to provide adequate filtering.

The voltage from the secondary winding 41 of the saturating transformer 35 is rectified by the full wave rectifier 42 and the resultant D. C. voltage is applied to the speed control winding 29 through a current-limiting resistor 43.

The transformer 35 is so constructed that it saturates at voltage values below those normally applied by the rotary switch 12. As a result, the flux produced is substantially a square wave of constant amplitude corresponding to the saturation flux. This is seen in Fig. 2, where the wave forms of primary current, mutual flux, secondary voltage and rectified output current of the saturating transformer 35 are shown on a common time base.

The voltage output is seen to be peaked in wave form and the positive peaks 44 which correspond to the build up of flux in the transformer are smaller in amplitude than the negative peaks 45 which correspond to the decay of the flux. The integrated area under each pulse is the same, however, as it is equal to the saturation flux, which is constant for a given transformer.

At increased speeds of the rotary switch 12 the area per voltage pulse is still the same but there are more pulses per unit time. The average D. C. output current is proportional to the number of pulses per unit time and therefore to the rotational speed of the clutch output shaft and the speed winding thus carries a current unidirectional and of an average value proportional to the output speed, which is the result desired.

The fluxes furnished by the reference winding 27 and the speed winding 29 are mutually opposed. That is, the net control flux which determines the output D. C. to the clutch coil is a function of the speed. Any tendency for the speed to decrease below its normal set value means more net flux (less opposition to flux furnished by the reference winding 27) which means lower reactance of the load windings, 14, 15 and more clutch coil excitation resulting in more torque and increased speed until the flux furnished by the speed winding 29 increases to its normal balancing speed value. Different balancing speeds may be preset by adjustment of the potentiometer 28, and hunting may be controlled by setting the feedback rheostat 20. Similarly, if the output speed should increase due to decreased load for example, the current to the speed winding 29 would increase thus increasing the opposition to the reference flux and decreasing the net control flux. This increases the reactance of the load windings 14, 15 and less current is supplied to the clutch coil 13 resulting in less torque transmission by the clutch and a decrease output speed to its balancing value. There is thus produced a regulation of the output speed about a value predetermined by the setting of the potentiometer 28.

Although there is shown a specific means for interrupting the current input to the saturating transformer 35 this invention is not to be construed as so limited but includes within its scope any means for providing a series of unidirectional pulses of a repetition rate proportional to the output rotational speed of the clutch.

It is important that the time constant of the speed winding 29 be low to permit fast response of flux to changes in speed. This means that a low voltage circuit should be used having but few winding turns and with resistance inserted in the speed winding circuit. Conventional dynamoelectric tachometer generators are generally not suitable for supplying this type of circuit because of the poor voltage regulation when any current is drawn. The interrupter type of tachometer circuit according to this invention is especially well adapted to supply firm current in this type of circuit and the rotating element is small, simple and easy to apply. As long as the D. C. voltage applied to the transformer 35 is sufficient to saturate it, the output current is insensitive to any D. C. voltage change above that value, and, since no regulating devices are necessary to maintain constant the excitation to the transformer, this simplifies the circuit without sacrifice of its reliability.

It will be noted that fixed, series resistances 43, 46, 47 and 48 are placed in all the control-winding circuits and this is done to secure low L/R values, thus to reduce the time constants and increase the rate of response of these circuits. The shunt capacitors 49, 50 resonate with the respective load winding inductances in the unsaturated condition of the core to increase the impedance and thus help to make the load current more nearly zero at zero control flux. A filter capacitor 51 is placed across the output of the bridge rectifiers 16, 17, 18 and 19.

The relative instantaneous polarities of the flux produced by the control windings 24, 27, 29, 30 are indicated by the directions of the arrows adjacent thereto. It will be seen that, regarding the system as an amplifier with feedback, the input signal is furnished by the reference winding, the speed winding provides negative feedback, and the compensating winding furnishes positive feedback.

Having thus described the nature of the invention, what I claim herein is:

1. In a motor speed control system, an electric motor, and electric slip clutch driven by said motor, a variable load driven by said clutch, an excitation winding for said clutch, means for controlling the current supplied to the excitation winding including a magnetic amplifier having load windings and control windings, and a speed-responsive current supply for one of said control windings comprising a D. C. voltage source, a saturating transformer, a circuit interrupter driven by said clutch for supplying current from the D. C. voltage source to the primary of said transformer at a pulse repetition rate determined by the output speed of said clutch and of a value sufficient to saturate the transformer, and a rectifier connected between the secondary of the saturating transformer and the control winding.

2. A system for supplying a direct current having an average value directly proportional to the rotational speed of a shaft, comprising a source of alternating current, a first rectifier connected to said source, a rotatable shaft, a current make-and-break device connected for operation responsive to the rotation of said shaft, a saturating transformer connected for intermittent energization to saturation from said first rectifier through said make-and-break device, and a second rectifier connected to said saturating transformer.

3. In a speed control system in which an electrically-controlled variable slip coupling is connected between an electric motor and a variable load, means for controlling the current excitation for said coupling to maintain a constant load speed, comprising a saturable core reactor having load windings and control windings for controlling the impedance of said load windings, a speed-responsive current supply for one of said control windings including a source of D. C., a saturating transformer, a circuit-making and -breaking device operative responsive to the rotational speed of the load for applying pulses of energy from said D. C. source to the primary of the saturating transformer and of a value sufficient to saturate same and rectifier means connected between the secondary of said saturating transformer and said control winding.

4. In a system for controlling the excitation current of an electrically-controlled slip clutch having an input member driven by an electric motor and an output member driving a variable load, a magnetic amplifier for supplying said excitation current including a control winding fed from a speed-responsive D. C. supply comprising a saturating transformer, fed from a source of D. C. pulses having a repetition rate directly proportional to the rotary speed of said output member and having a value sufficient to saturate the transformer, and a rectifier connected to the secondary of said transformer for averaging the volt-second areas of the output voltage pulses to provide a direct current to the control winding which has a magnitude directly proportional to the rotary speed of the output member.

5. In a speed control system having an electric motor connected to drive a variable load through an electromagnetic slip coupling an excitation winding for said coupling, means to control the current to said winding to vary the slip of the coupling to provide a constant speed at the load, including saturable reactor means having load windings and control windings, one of said control windings being connected to a source of speed-responsive current comprising a D. C. voltage supply, a saturating transformer, a circuit-making and -breaking device operated at the rotary speed of the load for applying D. C., pulses of saturating value from said supply to the primary winding of said transformer, and rectifier means connected to the secondary winding of the saturating transformer for supplying a unidirectional current of an average value which varies directly in proportion to the variation in the load speed.

6. A control system comprising an electric motor, an electromagnetic slip coupling driven by said motor, a variable load driven by said coupling, an exciting winding for said coupling, saturable reactor means having self-saturating load windings and control windings, said load windings being connected in adjacent legs of a bridge rectifier circuit for supplying a controlled direct current to said exciting winding, said control windings being connected for establishing a net control flux responsive to a fixed reference current, a bias current, a current proportional to the current to the coupling winding, and a current proportional to the load speed, and a speed-responsive voltage-supply circuit including a source of D. C. voltage, a saturating transformer, a circuit-making and -breaking device connected for frequency of operation responsive to the load speed to supply pulses of saturating D. C. to the primary winding of said transformer at a repetition rate determined by said speed, and a rectifier circuit connected to the secondary winding of the saturating transformer for supplying said speed-responsive voltage.

7. A control system comprising an electric motor, an electromagnetic slip coupling driven by said motor, a variable load driven by said coupling, an exciting winding for said coupling, a saturable core reactor, load windings on said reactor connected in the adjacent legs of a bridge rectifier circuit supplying current to said exciting winding, control windings on said reactor for establishing a net control flux, one of said control windings being energized by a direct current of a magnitude directly proportional to the rotational speed of the load and means for supplying said direct current comprising a rectifier device, a circuit-making and -breaking device and a saturating transformer connected in series circuit relation, said circuit-making and -breaking devices being connected for rotation with the load to supply pulses of D. C. energy to the primary winding of the saturating transformer to saturate same at a repetition rate determined by the rotational speed of the load, and rectifier means associated with the output of said saturating transformer for averaging the current to the control winding.

8. In a speed control system having a magnetic amplifier for furnishing the control energy to the system, a control winding for the magnetic amplifier and means for supplying to said winding a unidirectional current having an average value directly proportional to the speed being controlled comprising a D. C. voltage source, a saturating transformer, a circuit interrupter driven at the speed to be controlled and electrically connected between the D. C. source and the primary of the transformer to supply saturating current at a pulse repetition rate determined by the speed to be controlled, and a rectifier connected between the secondary of the saturating transformer and the control winding.

References Cited in the file of this patent
UNITED STATES PATENTS

| | | | |
|---|---|---|---|
| 347,642 | Ripley | | Aug. 17, 1886 |
| 1,806,351 | Jansson | | May 19, 1931 |
| 1,920,814 | Stone | | Aug. 1, 1933 |
| 2,286,777 | Winther | | June 16, 1942 |
| 2,449,779 | Jaeschke | | Sept. 21, 1948 |
| 2,653,290 | Hooven | | Sept. 22, 1953 |